US010216173B2

(12) United States Patent
Nakamura et al.

(10) Patent No.: US 10,216,173 B2
(45) Date of Patent: Feb. 26, 2019

(54) MOTOR CONTROL DEVICE

(71) Applicant: FANUC CORPORATION, Yamanashi (JP)

(72) Inventors: Tsutomu Nakamura, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/602,993

(22) Filed: May 23, 2017

(65) Prior Publication Data
US 2017/0351247 A1 Dec. 7, 2017

(30) Foreign Application Priority Data

Jun. 2, 2016 (JP) ................................ 2016-111259

(51) Int. Cl.
*G05B 19/19* (2006.01)
*G05B 19/416* (2006.01)
*G05B 13/02* (2006.01)

(52) U.S. Cl.
CPC ....... *G05B 19/4163* (2013.01); *G05B 13/024* (2013.01); *G05B 2219/49356* (2013.01)

(58) Field of Classification Search
CPC ...... H02P 21/146; H02P 27/026; H02P 27/06; H02P 27/08; H02M 5/4505; G05B 5/01; G05B 11/42; G05B 19/19
USPC ........ 318/609, 610, 432, 434, 727, 798, 799
See application file for complete search history.

(56) References Cited

U.S. PATENT DOCUMENTS

| 5,587,638 A | * | 12/1996 | Kato | G05B 19/19 318/568.14 |
| 7,049,775 B2 | * | 5/2006 | Iwashita | B30B 15/0094 318/566 |
| 7,415,862 B2 | * | 8/2008 | Futamura | B30B 1/186 100/231 |
| 7,569,999 B2 | * | 8/2009 | Hayashi | H02P 5/50 318/286 |
| 7,619,384 B2 | * | 11/2009 | Iwashita | B21D 24/02 318/566 |
| 8,468,866 B2 | * | 6/2013 | Miyasaka | B21D 24/02 100/269.02 |

(Continued)

FOREIGN PATENT DOCUMENTS

JP 2006007296 A 1/2006
JP 2006326614 A 12/2006

*Primary Examiner* — Rina I Duda
(74) *Attorney, Agent, or Firm* — Karceski IP Law, PLLC

(57) ABSTRACT

A motor control device includes: a force command unit that designates a force to be applied to a workpiece to be machined by a machining device having a motor as a driving source; a force detecting unit that detects the force applied to the workpiece; a velocity-command calculating unit that calculates a velocity command based on the designated force and the detected force; a torque-command calculating unit that calculates a torque command based on the velocity command and the velocity of the motor; a motor control unit that controls the motor based on the torque command; a determining unit that determines the machining stage of the workpiece based on the detected force; and a gain changing unit that changes at least one of gains individually provided in the velocity-command calculating unit and the torque-command calculating unit in accordance with the determined machining stage.

6 Claims, 9 Drawing Sheets

(56) References Cited

U.S. PATENT DOCUMENTS

2006/0012326 A1 1/2006 Iwashita et al.
2006/0267535 A1 11/2006 Iwashita et al.

* cited by examiner

MOTOR CONTROL DEVICE

CROSS-REFERENCE TO RELATED APPLICATIONS

This application is based on and claims priority to Japanese Patent Application No. 2016-111259, filed on Jun. 2, 2016, the entire content of which is incorporated herein by reference.

FIELD OF THE INVENTION

The present invention relates to motor control devices suitable for controlling motors provided in machining devices.

BACKGROUND OF THE INVENTION

In machining, such as pressing or injection molding, it is necessary to control a motor while achieving both an operation (i.e., a pressing operation) for controlling the force (pressure) applied to a workpiece and a positioning operation (i.e., positional control) during a non-contact state. Assuming that the workpiece has linear spring characteristics, the pressure applied to the workpiece may be controlled by controlling the pressing amount from the contact point during machining.

Normally, motor control devices have a velocity control loop and a positional control loop. The Publication of Japanese Patent No. 4015139 discloses incorporating a pressing loop that controls the pressing amount as an alternative to the positional control loop so as to achieve both positional control and pressure control.

In order to achieve stable molding quality of the workpiece by controlling the force as designated by a user, it is preferable to increase the gain of a force controller within a stable range. This range is set in accordance with the characteristics of the workpiece and is fixed in a case where the workpiece has linear spring characteristics but is variable in a case where the workpiece has nonlinear spring characteristics. Therefore, in such cases, it is desirable that the gain be changed in accordance with, for example, the pressing amount.

The Publication of Japanese Patent No. 4112571 discloses changing the gain based on a spring constant of a somewhat high value determined from a force command value or a force detection value with respect to a workpiece having nonlinear spring characteristics.

SUMMARY OF THE INVENTION

The present invention provides the following solutions.

An aspect of the present invention provides a motor control device including a force command unit that designates a force to be applied to a workpiece to be machined by a machining device having a motor as a driving source, a force detecting unit that detects the force applied to the workpiece, a velocity-command calculating unit that calculates a velocity command based on the designated force and the detected force, a torque-command calculating unit that calculates a torque command based on the velocity command and a velocity of the motor, a motor control unit that controls the motor based on the torque command, a determining unit that determines the state of plastic deformation of the workpiece, and a gain changing unit that changes at least one of gains individually provided in the velocity-command calculating unit and the torque-command calculating unit in accordance with the determined state.

DESCRIPTION OF EMBODIMENT(S)

A motor control system according to an embodiment of the present invention will be described in detail below with reference to the drawings.

Figure 1:
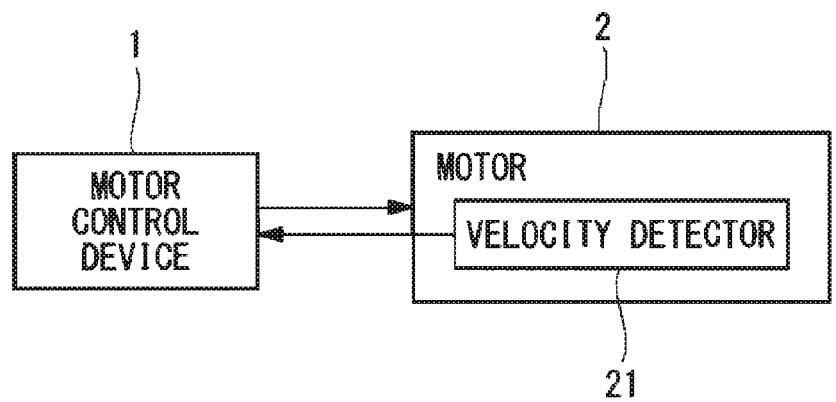
FIG. 1 is a block diagram schematically illustrating the configuration of a motor control system according to an embodiment of the present invention.

As shown in FIG. 1, the motor control system according to this embodiment includes a motor control device 1 and a motor 2. The motor control device 1 is configured to control the motor 2 in accordance with a motor velocity detected by a velocity detector 21 provided in the motor 2.

For example, the motor control system according to this embodiment is incorporated in a machining device, such as a riveting device.

Normally, a machining device, such as a riveting device, sequentially performs the following steps:

step 1 for approaching a workpiece to apply a force (pressure) to the workpiece from a non-contact state;

step 2 for coming into contact with the workpiece;

step 3 for increasing the pressing amount and the force (pressure) applied to the workpiece;

step 4 for controlling the force (pressure) for a desired time period;

step 5 for decreasing the pressing amount and the force (pressure) applied to the workpiece; and step 6 for moving away from the workpiece.

In the case where the machining device is a riveting device, the workpiece is a rivet.

Figure 2:
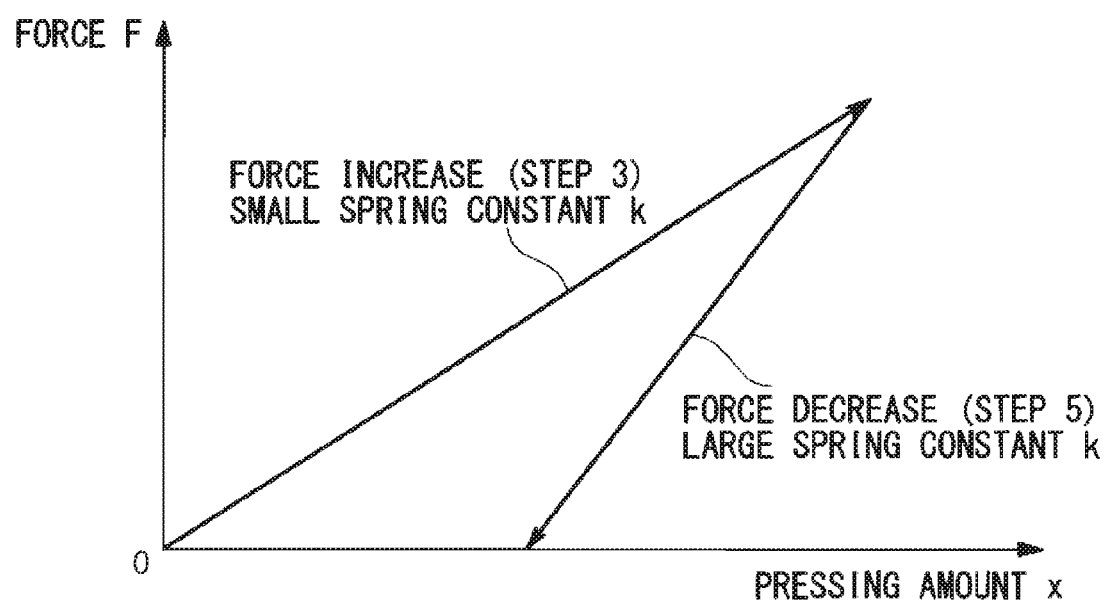
FIG. 2 illustrates the relationship between the pressing amount and the force applied to a plastically deformable workpiece.

In a case where the workpiece is plastically deformable, like a rivet, the spring constant k when the workpiece is regarded as a spring varies between when the force is increased in step 3 and when the force is decreased in step 5. As shown in FIG. 2, the force F increases gradually relative to the pressing amount x in step 3, whereas the force F decreases rapidly relative to the pressing amount x in step 5 due to plastic deformation of the workpiece. In other words, the gradient, that is, the spring constant k, is small in step 3, whereas the gradient, that is, the spring constant k, is large in step 5. Therefore, with regard to a plastically deformable workpiece, it is preferable to change the gain in accordance with the steps (i.e., machining stages), or in other words, the state of plastic deformation of the workpiece.

First Embodiment

A motor control device 1 according to a first embodiment of the present invention, which is included in the above-described motor control system, will be described below with reference to the drawings.

Figure 3:
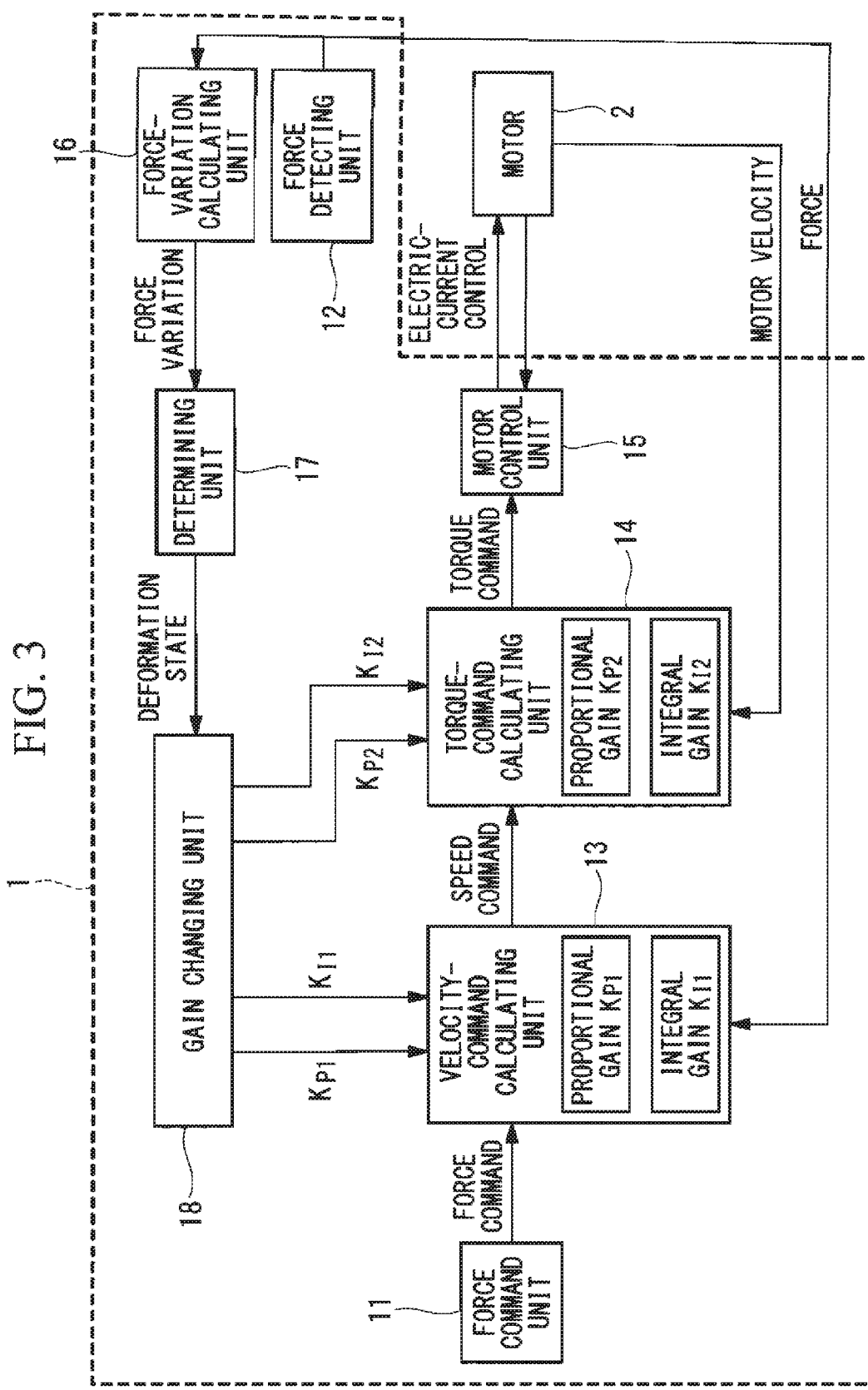
FIG. 3 is a block diagram schematically illustrating the configuration of a motor control device according to a first embodiment of the present invention.

As shown in FIG. 3, the motor control device 1 includes, as functional blocks, a force command unit 11, a force detecting unit 12, a velocity-command calculating unit 13, a torque-command calculating unit 14, a motor control unit 15, a force-variation calculating unit 16, a determining unit 17, and a gain changing unit 18.

Furthermore, the motor control device 1 includes a processor (not shown) and memory units, such as a read-only memory (ROM) and a random access memory (RAM), and the processor is configured to realize the respective functions.

As shown in FIG. 3, the force command unit 11 is connected to the velocity-command calculating unit 13. The velocity-command calculating unit 13 is connected to the torque-command calculating unit 14. The torque-command calculating unit 14 is connected to the motor control unit 15. The motor control unit 15 is connected to the motor 2. The motor 2 is connected to the torque-command calculating unit 14. The force detecting unit 12 is connected to the velocity-command calculating unit 13 and the force-variation calculating unit 16. The force-variation calculating unit 16 is connected to the determining unit 17. The determining unit 17 is connected to the gain changing unit 18. The gain changing unit 18 is connected to a proportional gain $K_{P1}$ and an integral gain $K_{I1}$ of the velocity-command calculating unit 13 and to a proportional gain $K_{P2}$ and an integral gain $K_{I2}$ of the torque-command calculating unit 14.

The force command unit 11 is configured to generate a force command, which is a target value of force to be applied to the workpiece.

The force detecting unit 12 is constituted of, for example, a pressure sensor that is attached to the machining device so as to detect the force applied to the workpiece.

The velocity-command calculating unit 13 has the proportional gain $K_{P1}$ and the integral gain $K_{I1}$ and is configured to calculate a velocity command from the force command generated by the force command unit 11, the force fed back from the force detecting unit 12, and the proportional gain $K_{P1}$ and the integral gain $K_{I1}$. The proportional gain $K_{P1}$ and the integral gain $K_{I1}$ are configured to be independently changeable by the gain changing unit 18. Alternatively, the velocity command may be calculated by performing proportional-integral (PI) control using the proportional gain $K_{P1}$ and the integral gain $K_{I1}$.

The torque-command calculating unit 14 has the proportional gain $K_{P2}$ and the integral gain $K_{I2}$ and is configured to calculate a torque command from the velocity command calculated by the velocity-command calculating unit 13, the motor velocity fed back from the motor 2, and the proportional gain $K_{P2}$ and the integral gain $K_{I2}$. The proportional gain $K_{P2}$ and the integral gain $K_{I2}$ are configured to be independently changeable by the gain changing unit 18. Alternatively, the torque command may be calculated by performing proportional-integral (PI) control using the proportional gain $K_{P2}$ and the integral gain $K_{I2}$.

The motor control unit 15 is configured to perform electric-current control on the motor 2 based on the torque command calculated by the torque-command calculating unit 14.

The force-variation calculating unit 16 is configured to calculate a force variation, which is an amount of change in the force detected by the force detecting unit 12 per unit time (control cycle).

The determining unit 17 is configured to determine the machining stage of the workpiece based on the force variation calculated by the force-variation calculating unit 16. Specifically, in a case where the force variation is larger than zero, that is, in a case where the sign thereof is positive, the determining unit 17 determines that the force applied to the workpiece is increasing and that the workpiece is at a machining stage where the spring constant k is small. In a case where the force variation is smaller than zero, that is, in a case where the sign thereof is negative, the determining unit 17 determines that the force applied to the workpiece is decreasing and that the workpiece is at a machining stage where the spring constant k is large. In other words, the determining unit 17 determines the state of plastic deformation of the workpiece depending on whether the sign is positive or negative.

The gain changing unit 18 is capable of independently changing the proportional gain $K_{P1}$ and the integral gain $K_{I1}$ of the velocity-command calculating unit 13 and the proportional gain $K_{P2}$ and the integral gain $K_{I2}$ of the torque-command calculating unit 14 based on the state determined by the determining unit 17. Specifically, in a case where it is determined that the spring constant k is small, at least one of the proportional gain $K_{P1}$, the integral gain $K_{I1}$, the proportional gain $K_{P2}$, and the integral gain $K_{I2}$ is set to be high. In a case where it is determined that the spring constant k is large, at least one of the proportional gain $K_{P1}$, the integral gain $K_{I1}$, the proportional gain $K_{P2}$, and the integral gain $K_{I2}$ is set to be low. In particular, in order to suppress the occurrence of undershooting where the force applied to the workpiece significantly falls below the force command, it is necessary to lower the integral gain $K_{I1}$ and the integral gain $K_{I2}$.

Accordingly, because the proportional gain $K_{P1}$, the proportional gain $K_{P2}$, the integral gain $K_{I1}$, and the integral gain $K_{I2}$ can be independently changed, the responsiveness to the force and the asymptotic characteristics relative to the force command can be individually designed.

Figure 4:
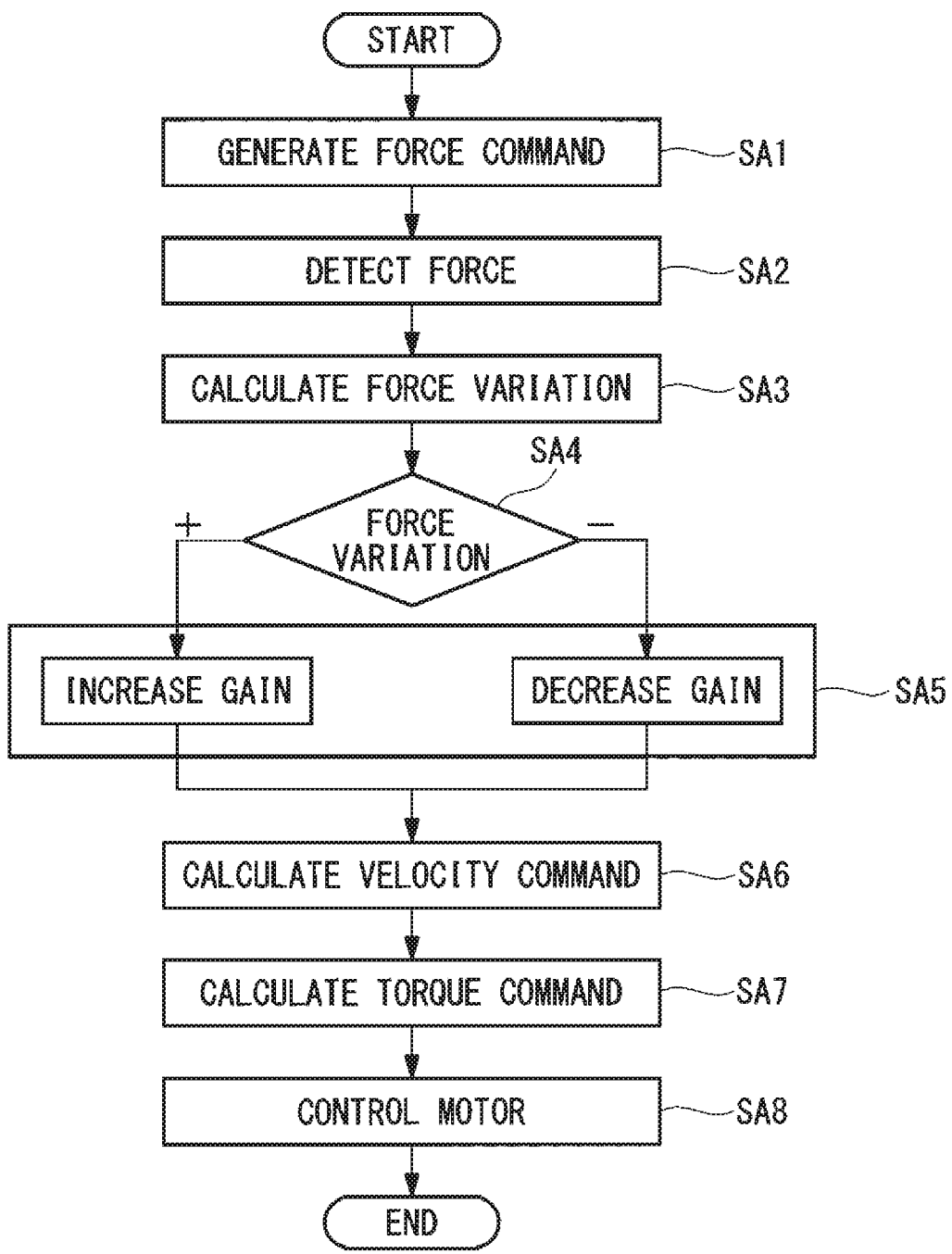
FIG. 4 is a flowchart illustrating a process performed in the motor control device according to the first embodiment of the present invention.

Next, the operation of the motor control device 1 having the above-described configuration will be described with reference to FIGS. 3 and 4. FIG. 4 illustrates a process executed in one control cycle by the processor (not shown) provided in the motor control device 1.

First, the force command unit 11 generates a force command, which is a target value of force to be applied to a workpiece (step SA1 in FIG. 4). Furthermore, the force detecting unit 12 detects the force applied to the workpiece (step SA2 in FIG. 4). Then, the force-variation calculating unit 16 calculates a variation relative to the force applied to the workpiece in the preceding control cycle (step SA3 in FIG. 4). Subsequently, the determining unit 17 determines whether the sign of the force variation is positive or negative (step SA4 in FIG. 4). If the sign is positive, the gain changing unit 18 sets at least one of the proportional gain $K_{P1}$, the integral gain $K_{I1}$, the proportional gain $K_{P2}$, and the integral gain $K_{I2}$ to be high. If the sign is negative, the gain changing unit 18 sets at least one of the proportional gain $K_{P1}$, the integral gain $K_{I1}$, the proportional gain $K_{P2}$, and the integral gain $K_{I2}$ to be low (step SA5 in FIG. 4).

If the force variation is zero, the gain changing unit 18 may set at least one of the proportional gain $K_{P1}$, the integral gain $K_{I1}$, the proportional gain $K_{P2}$, and the integral gain $K_{I2}$ to be high or may set at least one of the proportional gain $K_{P1}$, the integral gain $K_{I1}$, the proportional gain $K_{P2}$, and the integral gain $K_{I2}$ to be low. For example, the immediately preceding gain may be maintained.

Subsequently, the velocity-command calculating unit 13 calculates a velocity command by multiplying the gain by a deviation between the force command generated by the force command unit 11 and the force fed back from the force detecting unit 12 (step SA6 in FIG. 4). Then, the torque-command calculating unit 14 calculates a torque command by multiplying the gain by a deviation between the velocity command calculated by the velocity-command calculating unit 13 and the motor velocity fed back from the motor 2 (step SA7 in FIG. 4).

Then, the motor control unit 15 performs motor control based on the torque command calculated by the torque-command calculating unit 14 and an electric current value fed back from the motor 2 (step SA8 in FIG. 4).

Accordingly, when machining a plastically deformable workpiece, gain adjustment based on a force variation is performed at every control cycle in accordance with the machining stage so that the motor can be controlled with high accuracy. As a result, the machining accuracy of the workpiece can be enhanced.

Second Embodiment

A motor control device 3 according to a second embodiment, which is included in the above-described motor control system, will be described below with reference to the drawings.

Figure 5:
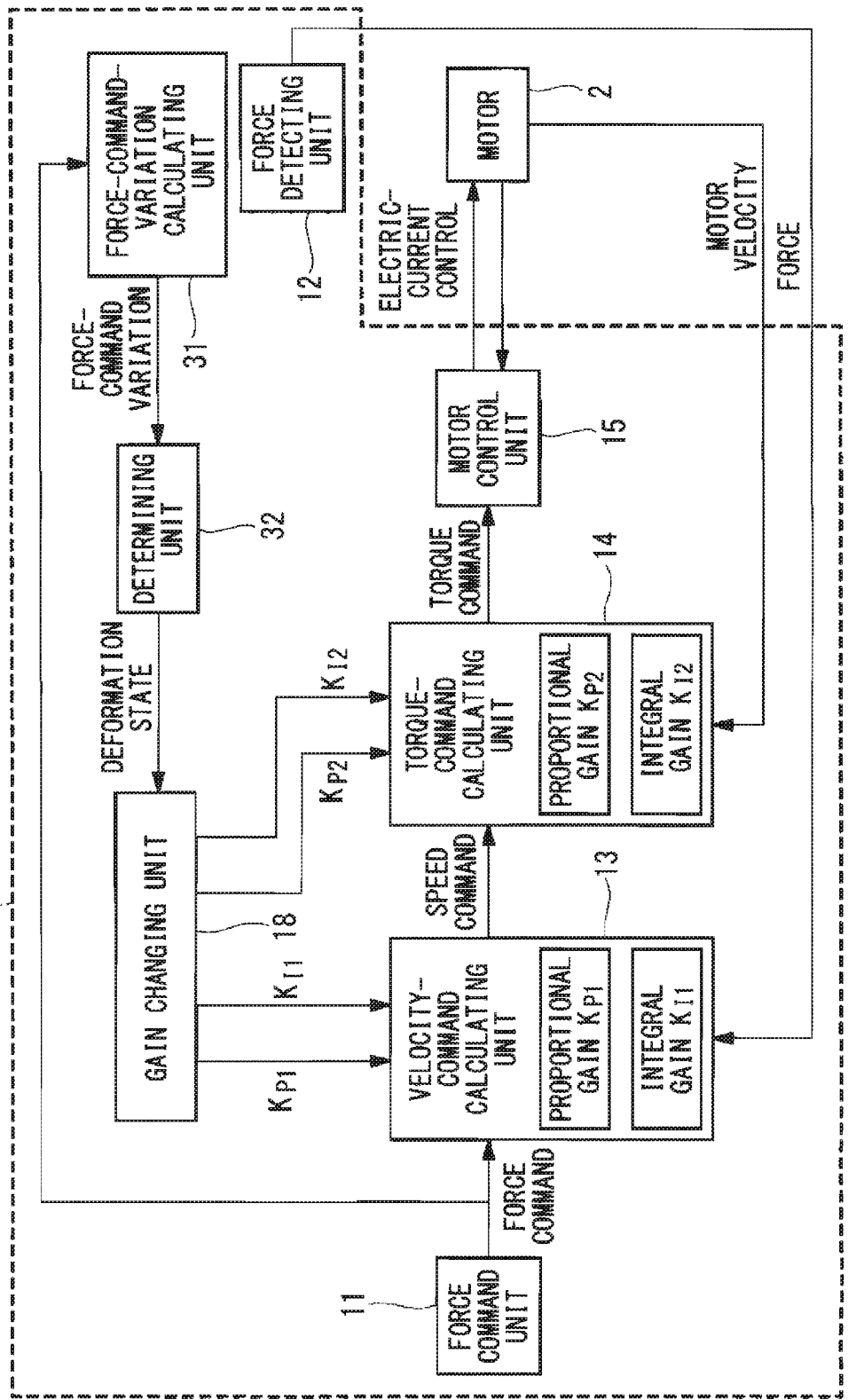
FIG. 5 is a block diagram schematically illustrating the configuration of a motor control device according to a second embodiment of the present invention.

As shown in FIG. 5, the motor control device 3 includes, as functional blocks, a force command unit 11, a force detecting unit 12, a velocity-command calculating unit 13, a torque-command calculating unit 14, a motor control unit 15, a gain changing unit 18, a force-command-variation calculating unit 31, and a determining unit 32.

Furthermore, the motor control device 3 includes a processor (not shown) and memory units, such as a ROM and a RAM, and the processor is configured to realize the respective functions.

As shown in FIG. 5, the force command unit 11 is connected to the velocity-command calculating unit 13 and the force-command-variation calculating unit 31. The velocity-command calculating unit 13 is connected to the torque-command calculating unit 14. The torque-command calculating unit 14 is connected to the motor control unit 15. The motor control unit 15 is connected to the motor 2. The motor 2 is connected to the torque-command calculating unit 14. The force detecting unit 12 is connected to the velocity-command calculating unit 13. The force-command-variation calculating unit 31 is connected to the determining unit 32. The determining unit 32 is connected to the gain changing unit 18. The gain changing unit 18 is connected to a proportional gain $K_{P1}$ and an integral gain $K_{I1}$ of the velocity-command calculating unit 13 and to a proportional gain $K_{P2}$ and an integral gain $K_{I2}$ of the torque-command calculating unit 14.

Accordingly, the motor control device 3 according to this embodiment differs in configuration from the motor control device 1 according to the first embodiment in that it includes the force-command-variation calculating unit 31 and the determining unit 32 in place of the force-variation calculating unit 16 and the determining unit 17. In the following description, components identical to those in the motor control device 1 according to the first embodiment will be given the same reference signs, and descriptions thereof will be omitted.

The force-command-variation calculating unit 31 is configured to calculate a force-command variation, which is an amount of change in a force command generated by the force command unit 11 per unit time (control cycle).

The determining unit 32 is configured to determine the machining stage of the workpiece based on the force-command variation calculated by the force-command-variation calculating unit 31. Specifically, in a case where the force-command variation is larger than zero, that is, in a case where the sign thereof is positive, the determining unit 32 determines that the force applied to the workpiece is increasing and that the workpiece is at a machining stage where the spring constant k is small. In a case where the force-command variation is smaller than zero, that is, in a case where the sign thereof is negative, the determining unit 32 determines that the force applied to the workpiece is decreasing and that the workpiece is at a machining stage where the spring constant k is large. In other words, the determining unit 32 determines the state of plastic deformation of the workpiece depending on whether the sign is positive or negative.

The gain changing unit 18 is capable of independently changing the proportional gain $K_{P1}$ and the integral gain $K_{I1}$ of the velocity-command calculating unit 13 and the proportional gain $K_{P2}$ and the integral gain $K_{I2}$ of the torque-command calculating unit 14 based on the state determined by the determining unit 32.

Figure 6:
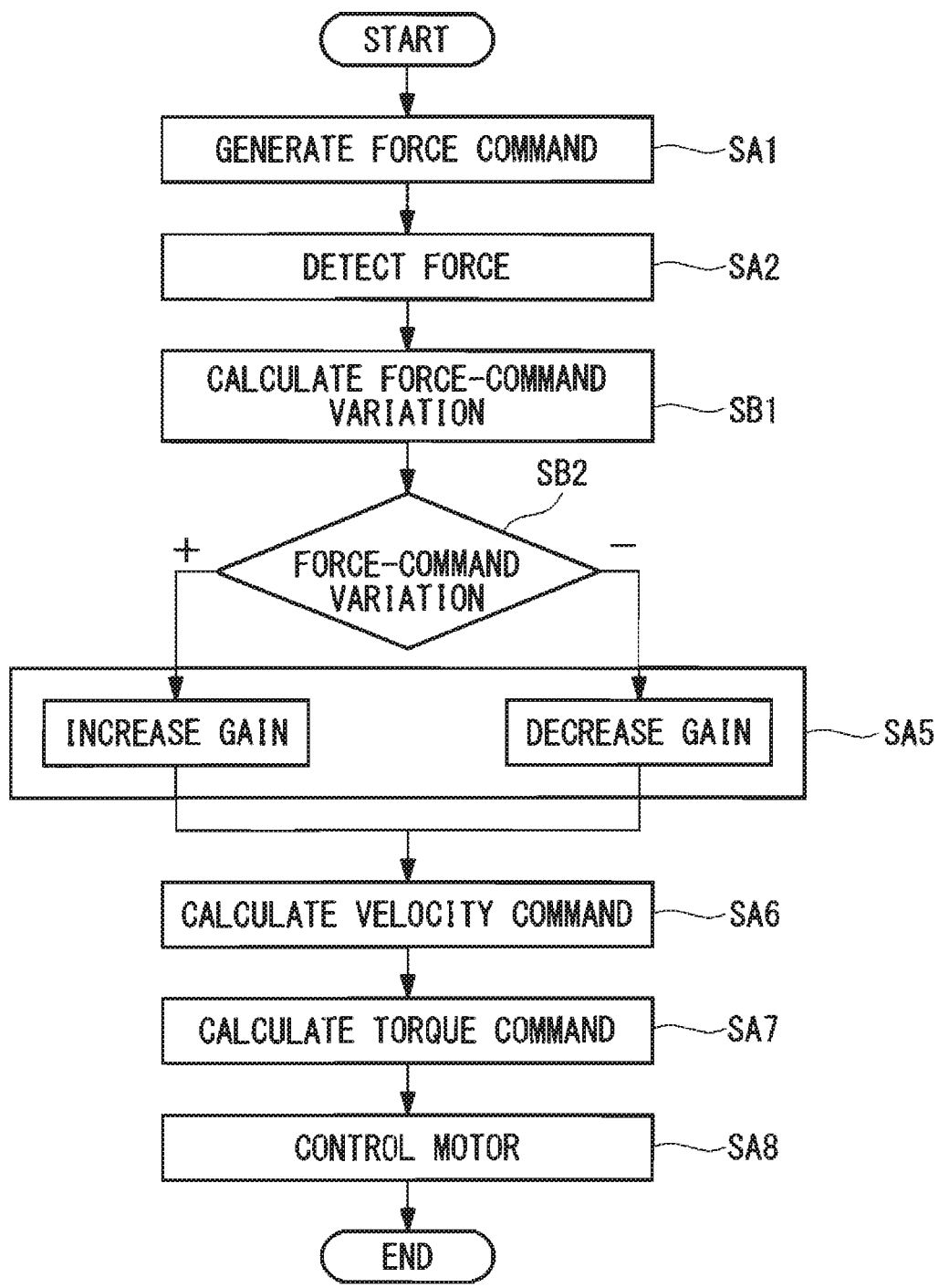
FIG. 6 is a flowchart illustrating a process performed in the motor control device according to the second embodiment of the present invention.

Next, the operation of the motor control device 3 having the above-described configuration will be described with reference to FIGS. 5 and 6. FIG. 6 illustrates a process executed in one control cycle by the processor (not shown) provided in the motor control device 3.

First, the force command unit 11 generates a force command, which is a target value of the force to be applied to a workpiece (step SA1 in FIG. 6). Furthermore, the force detecting unit 12 detects the force applied to the workpiece (step SA2 in FIG. 6). Then, the force-command-variation calculating unit 31 calculates a variation relative to the force command generated in the preceding control cycle (step SB1 in FIG. 6). Subsequently, the determining unit 32 determines whether the sign of the force-command variation is positive or negative (step SB2 in FIG. 6). If the sign is positive, the gain changing unit 18 sets at least one of the proportional gain $K_{P1}$, the integral gain $K_{I1}$, the proportional gain $K_{P2}$, and the integral gain $K_{I2}$ to be high. If the sign is negative, the gain changing unit 18 sets at least one of the proportional gain $K_{P1}$, the integral gain $K_{I1}$, the proportional gain $K_{P2}$, and the integral gain $K_{I2}$ to be low (step SA5 in FIG. 6).

If the force-command variation is zero, the gain changing unit 18 may set at least one of the proportional gain $K_{P1}$, the integral gain $K_{I1}$, the proportional gain $K_{P2}$, and the integral gain $K_{I2}$ to be high or may set at least one of the proportional gain $K_{P1}$, the integral gain $K_{I1}$, the proportional gain $K_{P2}$, and the integral gain $K_{I2}$ to be low. For example, the immediately preceding gain may be maintained.

The descriptions of subsequent steps will be omitted since they are identical to those in the first embodiment described above.

Accordingly, when machining a plastically deformable workpiece, gain adjustment based on a force-command variation is performed at every control cycle in accordance with the machining stage so that the motor 2 can be controlled with high accuracy. As a result, the machining accuracy of the workpiece can be enhanced.

Third Embodiment

A motor control device 4 according to a third embodiment, which is included in the above-described motor control system, will be described below with reference to the drawings.

Figure 7:
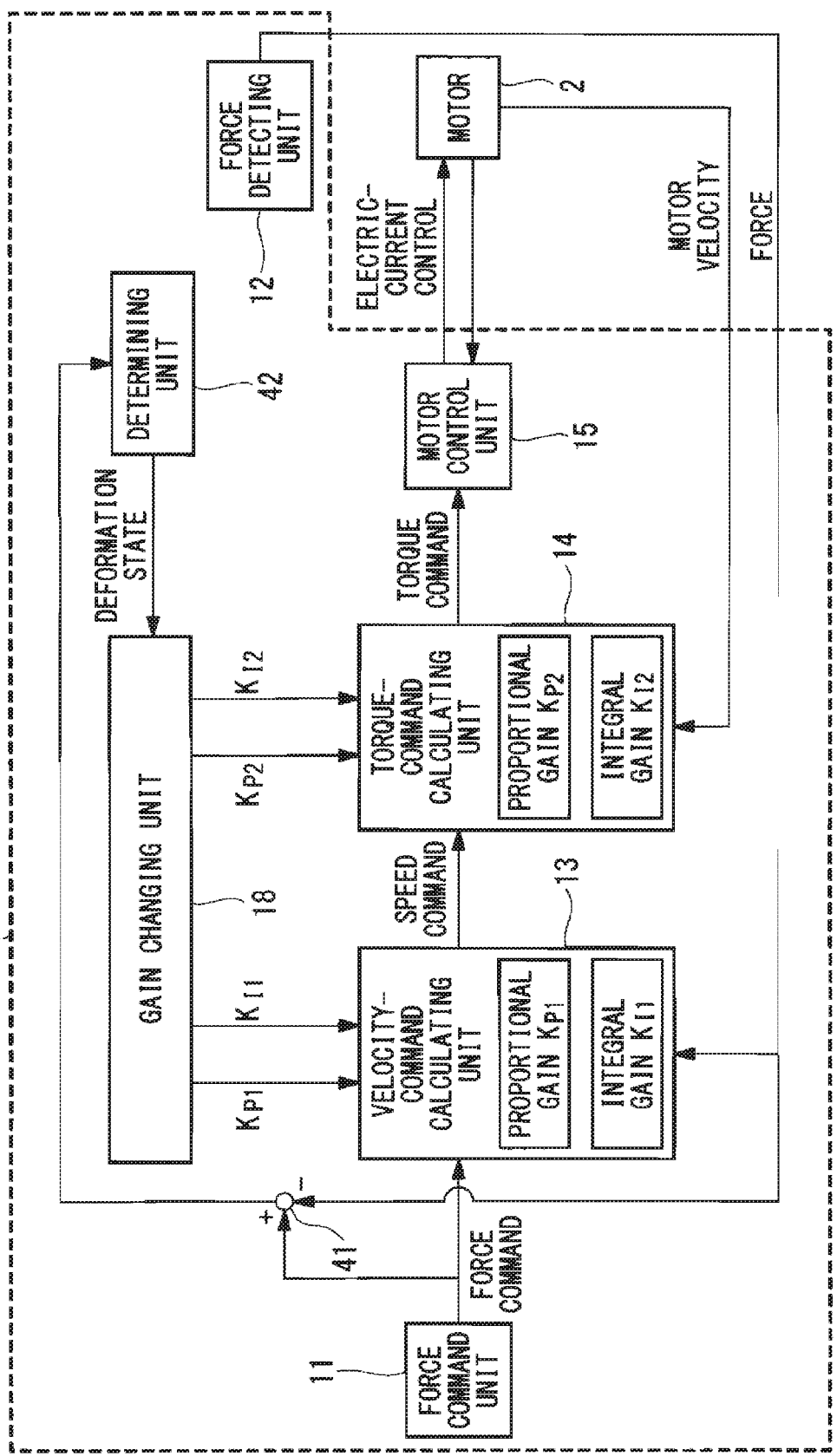
FIG. 7 is a block diagram schematically illustrating the configuration of a motor control device according to a third embodiment of the present invention.

As shown in FIG. 7, the motor control device 4 includes, as functional blocks, a force command unit 11, a force detecting unit 12, a velocity-command calculating unit 13, a torque-command calculating unit 14, a motor control unit 15, a gain changing unit 18, a subtracting unit 41, and a determining unit 42.

Furthermore, the motor control device 4 includes a processor (not shown) and memory units, such as a ROM and a RAM, and the processor is configured to realize the respective functions.

As shown in FIG. 7, the force command unit 11 is connected to the velocity-command calculating unit 13 and the subtracting unit 41. The velocity-command calculating unit 13 is connected to the torque-command calculating unit 14. The torque-command calculating unit 14 is connected to the motor control unit 15. The motor control unit 15 is connected to the motor 2. The motor 2 is connected to the torque-command calculating unit 14. The force detecting unit 12 is connected to the velocity-command calculating unit 13 and the subtracting unit 41. The subtracting unit 41 is connected to the determining unit 42. The determining unit 42 is connected to the gain changing unit 18. The gain changing unit 18 is connected to a proportional gain $K_{P1}$ and an integral gain $K_{I1}$ of the velocity-command calculating unit 13 and to a proportional gain $K_{P2}$ and an integral gain $K_{I2}$ of the torque-command calculating unit 14.

Accordingly, the motor control device 4 according to this embodiment differs in configuration from the motor control device 1 according to the first embodiment in that it includes the subtracting unit 41 and the determining unit 42 in place of the force-variation calculating unit 16 and the determining unit 17. In the following description, components identical to those in the motor control device 1 according to the first embodiment will be given the same reference signs, and descriptions thereof will be omitted.

The subtracting unit 41 is configured to calculate a force deviation by subtracting the force detected by the force detecting unit 12 from the force command generated by the force command unit 11.

The determining unit 42 is configured to determine the machining stage of the workpiece based on the force deviation obtained by the subtracting unit 41. Specifically, in a case where the force deviation is larger than zero, that is, in a case where the sign thereof is positive, the determining unit 42 determines that the force applied to the workpiece is increasing and that the workpiece is at a machining stage where the spring constant k is small. In a case where the force variation is smaller than zero, that is, in a case where the sign thereof is negative, the determining unit 42 determines that the force applied to the workpiece is decreasing and that the workpiece is at a machining stage where the spring constant k is large. In other words, the determining unit 42 determines the state of plastic deformation of the workpiece depending on whether the sign is positive or negative.

The gain changing unit 18 is capable of independently changing the proportional gain $K_{P1}$ and the integral gain $K_{I1}$ of the velocity-command calculating unit 13 and the proportional gain $K_{P2}$ and the integral gain $K_{I2}$ of the torque-command calculating unit 14 based on the state determined by the determining unit 42.

Figure 8:
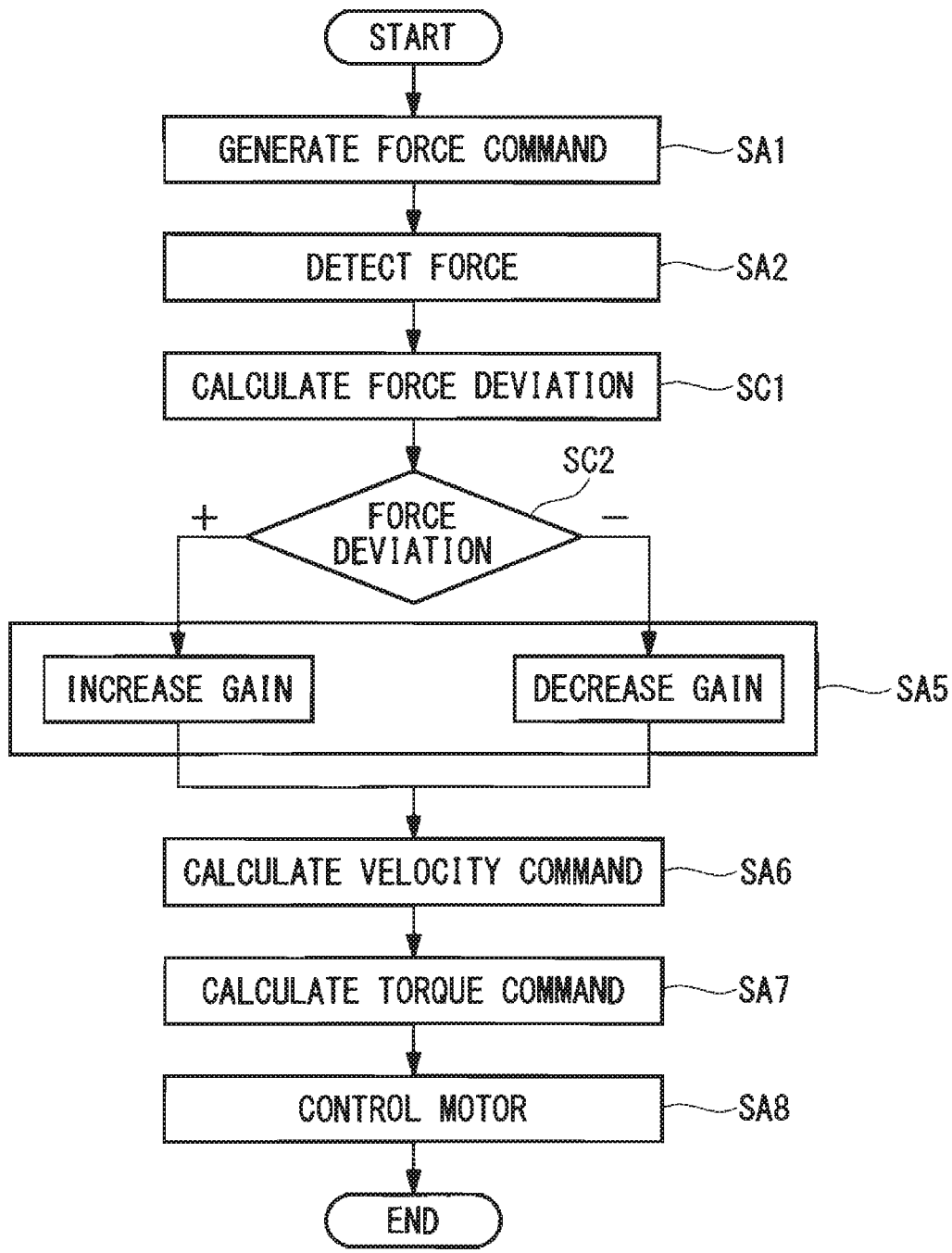
FIG. 8 is a flowchart illustrating a process performed in the motor control device according to the third embodiment of the present invention.

Next, the operation of the motor control device 4 having the above-described configuration will be described with reference to FIGS. 7 and 8. FIG. 8 illustrates a process executed in one control cycle by the processor (not shown) provided in the motor control device 4.

First, the force command unit 11 generates a force command, which is a target value of force to be applied to a workpiece (step SA1 in FIG. 8). Furthermore, the force detecting unit 12 detects the force applied to the workpiece (step SA2 in FIG. 8). Then, the subtracting unit 41 calculates a force deviation between the force command generated by the force command unit 11 and the force detected by the force detecting unit 12 (step SC1 in FIG. 8). Subsequently, the determining unit 42 determines whether the sign of the force deviation is positive or negative (step SC2 in FIG. 8). If the sign is positive, the gain changing unit 18 sets at least one of the proportional gain $K_{P1}$, the integral gain $K_{I1}$, the proportional gain $K_{P2}$, and the integral gain $K_{I2}$ to be high. If the sign is negative, the gain changing unit 18 sets at least one of the proportional gain $K_{P1}$, the integral gain $K_{I1}$, the proportional gain $K_{P2}$, and the integral gain $K_{I2}$ to be low (step SA5 in FIG. 8).

If the force deviation is zero, the gain changing unit 18 may set at least one of the proportional gain $K_{P1}$, the integral gain $K_{I1}$, the proportional gain $K_{P2}$, and the integral gain $K_{I2}$ to be high or may set at least one of the proportional gain $K_{P1}$, the integral gain $K_{I1}$, the proportional gain $K_{P2}$, and the integral gain $K_{I2}$ to be low. For example, the immediately preceding gain may be maintained.

The descriptions of subsequent steps will be omitted since they are identical to those in the first embodiment described above.

Accordingly, when machining a plastically deformable workpiece, gain adjustment based on a force deviation is performed at every control cycle in accordance with the machining stage so that the motor 2 can be controlled with high accuracy. As a result, the machining accuracy of the workpiece can be enhanced.

Fourth Embodiment

A motor control device 5 according to a fourth embodiment, which is included in the above-described motor control system, will be described below with reference to the drawings.

Figure 9:
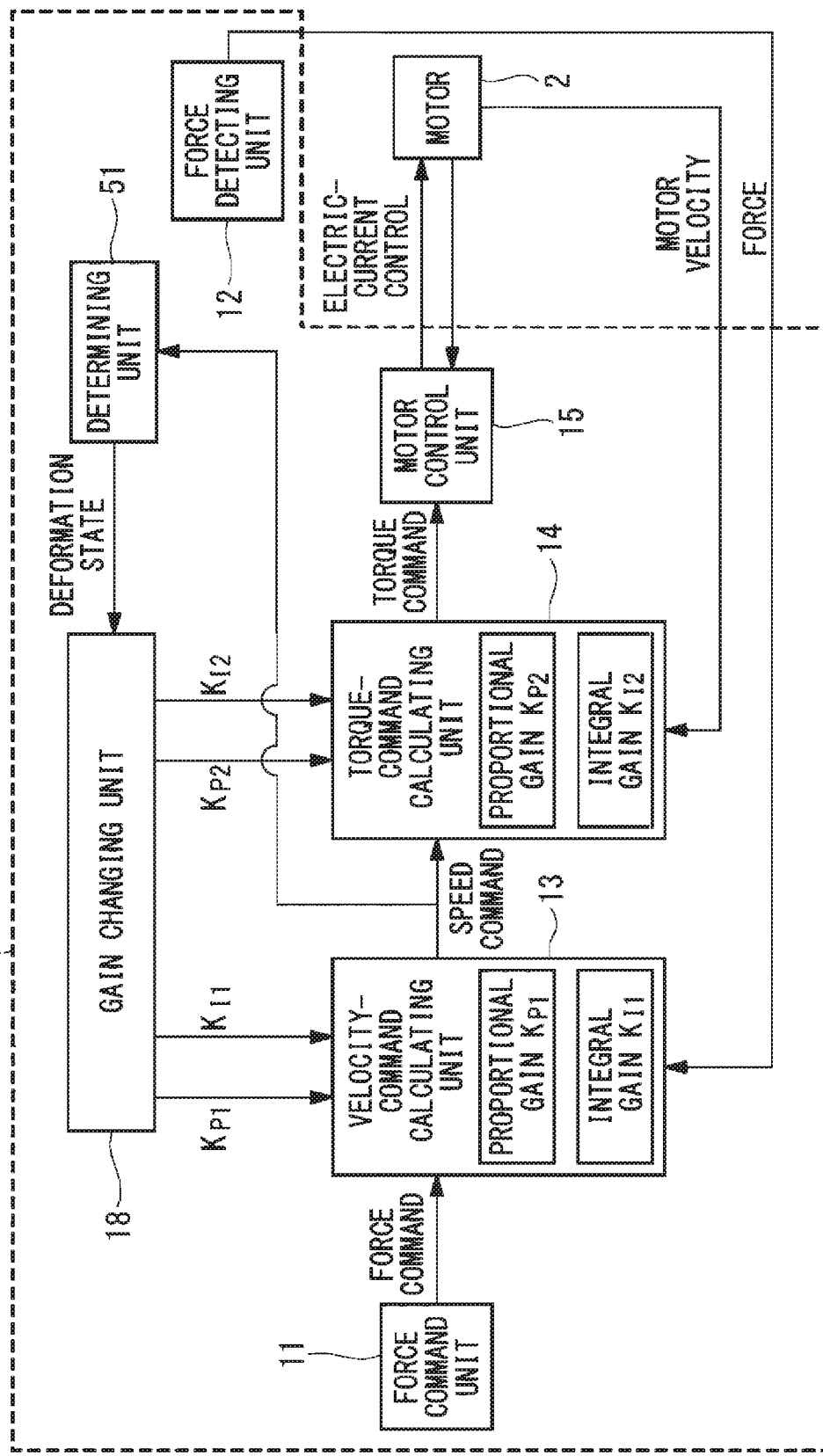
FIG. 9 is a block diagram schematically illustrating the configuration of a motor control device according to a fourth embodiment of the present invention.

As shown in FIG. 9, the motor control device 5 includes, as functional blocks, a force command unit 11, a force detecting unit 12, a velocity-command calculating unit 13, a torque-command calculating unit 14, a motor control unit 15, a gain changing unit 18, and a determining unit 51.

Furthermore, the motor control device 5 includes a processor (not shown) and memory units, such as a ROM and a RAM, and the processor is configured to realize the respective functions.

As shown in FIG. 9, the force command unit 11 is connected to the velocity-command calculating unit 13. The velocity-command calculating unit 13 is connected to the torque-command calculating unit 14 and the determining unit 51. The torque-command calculating unit 14 is connected to the motor control unit 15. The motor control unit 15 is connected to the motor 2. The motor 2 is connected to the torque-command calculating unit 14. The force detecting unit 12 is connected to the velocity-command calculating unit 13. The determining unit 51 is connected to the gain changing unit 18. The gain changing unit 18 is connected to a proportional gain $K_{P1}$ and an integral gain $K_{I1}$ of the velocity-command calculating unit 13 and to a proportional gain $K_{P2}$ and an integral gain $K_{I2}$ of the torque-command calculating unit 14.

Accordingly, the motor control device 5 according to this embodiment differs in configuration from the motor control device 1 according to the first embodiment in that it includes the determining unit 51 in place of the force-variation calculating unit 16 and the determining unit 17. In the following description, components identical to those in the motor control device 1 according to the first embodiment will be given the same reference signs, and descriptions thereof will be omitted.

The determining unit 51 is configured to determine the machining stage of the workpiece based on a velocity command calculated by the velocity-command calculating unit 13 in the preceding control cycle. Specifically, in a case where the velocity command in the preceding control cycle is larger than zero, that is, in a case where the sign thereof is positive, the determining unit 51 determines that the force applied to the workpiece is increasing and that the workpiece is at a machining stage where the spring constant k is small. In a case where the velocity command in the preceding control cycle is smaller than zero, that is, in a case where the sign thereof is negative, the determining unit 51 determines that the force applied to the workpiece is decreasing and that the workpiece is at a machining stage where the spring constant k is large. In other words, the determining unit 51 determines the state of plastic deformation of the workpiece depending on whether the sign is positive or negative.

The gain changing unit 18 is capable of independently changing the proportional gain $K_{P1}$ and the integral gain $K_{I1}$ of the velocity-command calculating unit 13 and the proportional gain $K_{P2}$ and the integral gain $K_{I2}$ of the torque-command calculating unit 14 based on the state determined by the determining unit 51.

Figure 10:
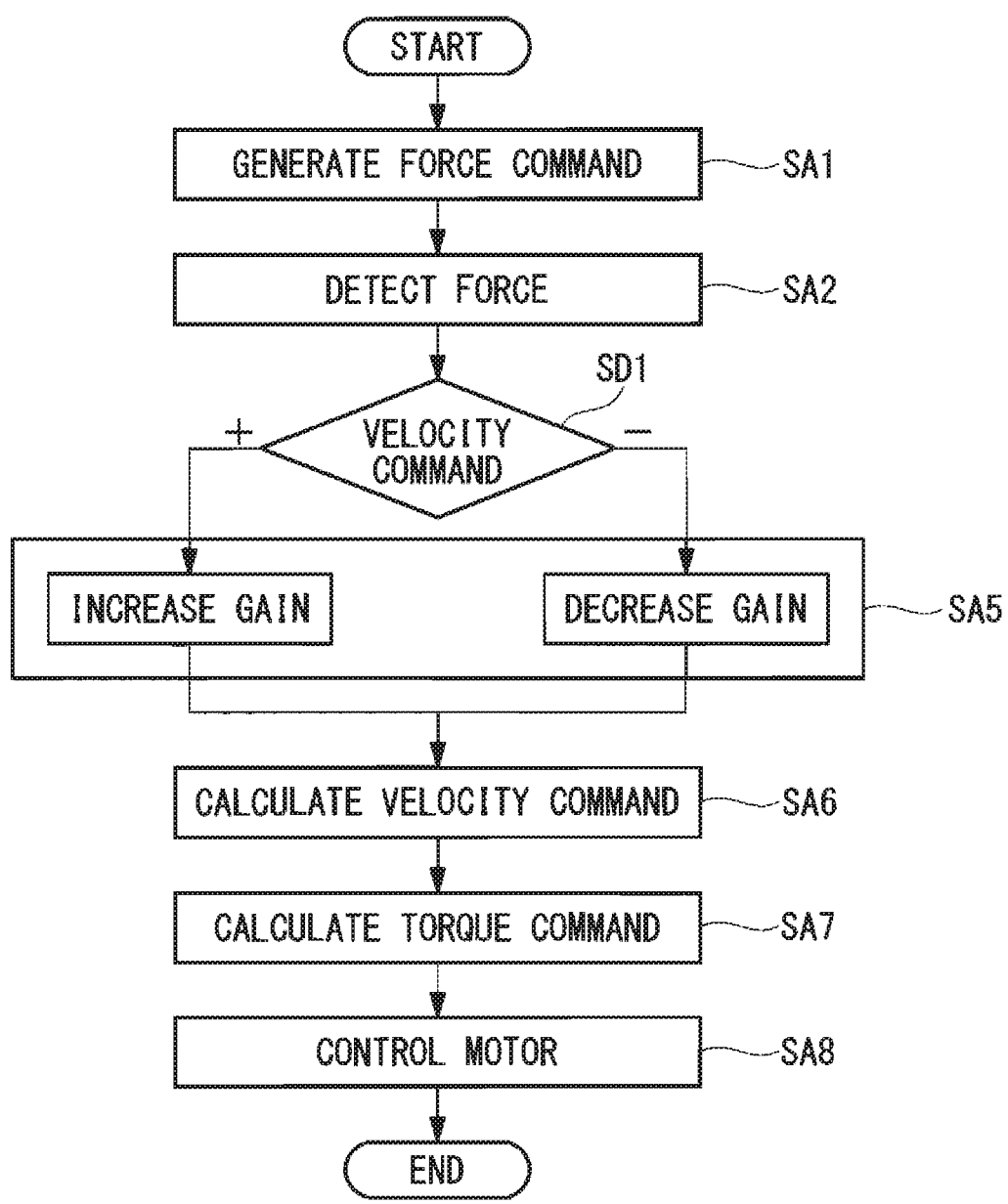
FIG. 10 is a flowchart illustrating a process performed in the motor control device according to the fourth embodiment of the present invention.

Next, the operation of the motor control device 5 having the above-described configuration will be described with reference to FIGS. 9 and 10. FIG. 10 illustrates a process executed in one control cycle by the processor (not shown) provided in the motor control device 5.

First, the force command unit 11 generates a force command, which is a target value of force to be applied to a workpiece (step SA1 in FIG. 10). Furthermore, the force detecting unit 12 detects the force applied to the workpiece (step SA2 in FIG. 10). Then, the determining unit 51 determines whether the sign of a velocity command in the preceding control cycle is positive or negative (step SD1 in FIG. 10). If the sign is positive, the gain changing unit 18 sets at least one of the proportional gain $K_{P1}$, the integral gain $K_{I1}$, the proportional gain $K_{P2}$, and the integral gain $K_{I2}$ to be high. If the sign is negative, the gain changing unit 18 sets at least one of the proportional gain $K_{P1}$, the integral gain $K_{I1}$, the proportional gain $K_{P2}$, and the integral gain $K_{I2}$ to be low (step SA5 in FIG. 10).

If the velocity command is zero, the gain changing unit 18 may set at least one of the proportional gain $K_{P1}$, the integral gain $K_{I1}$, the proportional gain $K_{P2}$, and the integral gain $K_{I2}$ to be high or may set at least one of the proportional gain $K_{P1}$, the integral gain $K_{I1}$, the proportional gain $K_{P2}$, and the integral gain $K_{I2}$ to be low. For example, the immediately preceding gain may be maintained.

The descriptions of subsequent steps will be omitted since they are identical to those in the first embodiment described above.

Accordingly, when machining a plastically deformable workpiece, gain adjustment based on a velocity command is performed at every control cycle in accordance with the machining stage so that the motor 2 can be controlled with high accuracy. As a result, the machining accuracy of the workpiece can be enhanced.

Although the embodiments of the present invention have been described in detail above with reference to the drawings, detailed configurations are not limited to these embodiments and include design modifications so long as they do not depart from the scope of the invention.

For example, the velocity-command calculating unit 13 and the torque-command calculating unit 14 may each have a differential gain in addition to the proportional gain and the integral gain, such that the motor 2 may be controlled in accordance with proportional-integral-differential (PID) control.

As a result, the above-described embodiments lead to the following aspect.

An aspect of the present invention provides a motor control device including a force command unit that designates a force to be applied to a workpiece to be machined by a machining device having a motor as a driving source, a force detecting unit that detects the force applied to the workpiece, a velocity-command calculating unit that calculates a velocity command based on the designated force and the detected force, a torque-command calculating unit that calculates a torque command based on the velocity command and a velocity of the motor, a motor control unit that controls the motor based on the torque command, a determining unit that determines the state of plastic deformation of the workpiece, and a gain changing unit that changes at least one of gains individually provided in the velocity-command calculating unit and the torque-command calculating unit in accordance with the determined state.

In the motor control device according to this aspect, the velocity-command calculating unit calculates the velocity command based on the force designated by the force command unit and the force fed back from the force detecting unit. Then, the torque-command calculating unit calculates the torque command based on the calculated velocity command and the motor velocity fed back from the motor, and the motor control unit controls the electric current of the motor based on this torque command. Moreover, the determining unit determines the state of plastic deformation of the workpiece, and the gain changing unit changes at least one of the gains provided in the velocity-command calculating unit and the torque-command calculating unit in accordance with this state.

Accordingly, the gain is appropriately changed in accordance with the state of plastic deformation of the workpiece, so that the motor can be controlled with high accuracy. As a result, the machining quality of the workpiece can be enhanced.

In the motor control device according to the above aspect, each gain may be at least one of a proportional gain and an integral gain, and the gain changing unit may be capable of independently changing the gains.

Accordingly, the responsiveness to the force and the asymptotic characteristics relative to the force command can be individually designed.

In the motor control device according to the above aspect, the determining unit may determine the state of plastic deformation in accordance with whether an input signal has a positive sign or a negative sign.

In this configuration, the motor control device according to the above aspect may further include a force-variation calculating unit that calculates a force variation from the detected force. The input signal may be the force variation.

The motor control device according to the above aspect may further include a force-command-variation calculating unit that calculates a force-command variation, which is an amount of change in the force, from the designated force. The input signal may be the force-command variation.

The motor control device according to the above aspect may further include a subtracting unit that calculates a deviation between the designated force and the detected force. The input signal may be the deviation.

In the motor control device according to the above aspect, the input signal may be the velocity command.

The present invention is advantageous in that a motor serving as a driving source for a machining device that machines a plastically deformable workpiece can be controlled with high accuracy.

The invention claimed is:

1. A motor control device comprising:
   a force command unit that designates a force to be applied to a workpiece to be machined by a machining device having a motor as a driving source;
   a force detecting unit that detects the force applied to the workpiece;
   a velocity-command calculating unit that calculates a velocity command based on the designated force and the detected force;
   a torque-command calculating unit that calculates a torque command based on the velocity command and a velocity of the motor;
   a motor control unit that controls the motor based on the torque command;
   a determining unit that determines the state of plastic deformation of the workpiece; and
   a gain changing unit that changes at least one of gains individually provided in the velocity-command calculating unit and the torque-command calculating unit in accordance with the determined state,
   wherein the determining unit determines the state of plastic deformation in accordance with whether an input signal has a positive sign or a negative sign.

2. The motor control device according to claim 1,
   wherein each gain is at least one of a proportional gain and an integral gain, and
   wherein the gain changing unit is configured to be capable of independently changing the gains.

3. The motor control device according to claim 1, further comprising:
   a force-variation calculating unit that calculates a force variation from the detected force,
   wherein the input signal is the force variation.

4. The motor control device according to claim 1, further comprising:
   a force-command-variation calculating unit that calculates a force-command variation, which is an amount of change in the force, from the designated force,
   wherein the input signal is the force-command variation.

5. The motor control device according to claim 1, further comprising:
   a subtracting unit that calculates a deviation between the designated force and the detected force,
   wherein the input signal is the deviation.

6. The motor control device according to claim 1,
   wherein the input signal is the velocity command.

* * * * *